United States Patent

Volkart et al.

[11] Patent Number: 5,875,411
[45] Date of Patent: Feb. 23, 1999

[54] METHOD OF DETECTING COMBUSTION MISFIRES BY EVALUATING RPM FLUCTUATIONS

[75] Inventors: Asmus Volkart, Bietigheim-Bissingen; Klaus Ries-Muller, Rappenau; Sigrid Hafner, Stuttgart; Jürgen Förster, Chemnitz; Wolfgang Wimmer, Erlenbach; Andrea Lohmann, Stuttgart, all of Germany

[73] Assignee: Robert Bosch GmbH, Stuttgart, Germany

[21] Appl. No.: 836,845

[22] PCT Filed: Aug. 30, 1996

[86] PCT No.: PCT/DE96/01609

§ 371 Date: Jun. 11, 1997

§ 102(e) Date: Jun. 11, 1997

[87] PCT Pub. No.: WO97/11345

PCT Pub. Date: Mar. 27, 1997

[30] Foreign Application Priority Data

Sep. 21, 1995 [DE] Germany .................. 195 34 996.2

[51] Int. Cl.⁶ .................................................. G01M 15/00
[52] U.S. Cl. ........................... 701/110; 73/116; 73/117.3; 123/419; 123/436
[58] Field of Search ................... 73/116, 117.2, 73/117.3; 701/101, 110, 111; 123/419, 436

[56] References Cited

U.S. PATENT DOCUMENTS

| | | | |
|---|---|---|---|
| 4,532,592 | 7/1985 | Citron et al. ......................... | 123/417 |
| 5,044,195 | 9/1991 | James et al. .......................... | 73/117.3 |
| 5,056,360 | 10/1991 | Dosdall et al. ......................... | 73/116 |
| 5,186,136 | 2/1993 | Kadomukai et al. ................. | 123/192.1 |
| 5,379,634 | 1/1995 | Kuroda et al. .......................... | 123/419 |
| 5,387,253 | 2/1995 | Remhoski et al. ..................... | 73/117.3 |
| 5,633,456 | 5/1997 | Stander ..................................... | 73/116 |
| 5,687,082 | 11/1997 | Rizzoni .................................. | 73/117.3 |

FOREIGN PATENT DOCUMENTS

| | | |
|---|---|---|
| 0709664 | 5/1996 | European Pat. Off. . |
| 2512952 | 3/1993 | France . |
| 4138765 | 7/1992 | Germany . |
| 05 113149 | 5/1993 | Japan . |

OTHER PUBLICATIONS

"Engine Misfire Detection" HAVANT GB, No. 324, Apr. 1991, p. 253.

*Primary Examiner*—George Dombroske
*Attorney, Agent, or Firm*—Walter Ottesen

[57] ABSTRACT

A method is introduced for detecting combustion misfires on the basis of the time-dependent course of the rotational movement of a transducer wheel, which is coupled to the crankshaft of an internal combustion engine. In this method, the segment times, in which predetermined segments of the transducer wheel pass a sensor, are detected and processed to a measure for the rough running of the internal combustion engine. A conclusion as to misfires is drawn from the behavior of the measure. The measure for the rough running is formed by digital filtering of segment times with predetermined filter coefficients.

6 Claims, 4 Drawing Sheets

FIG. 3(a)
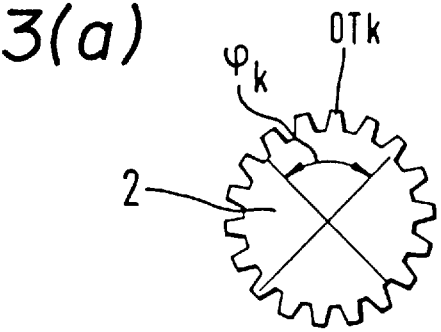
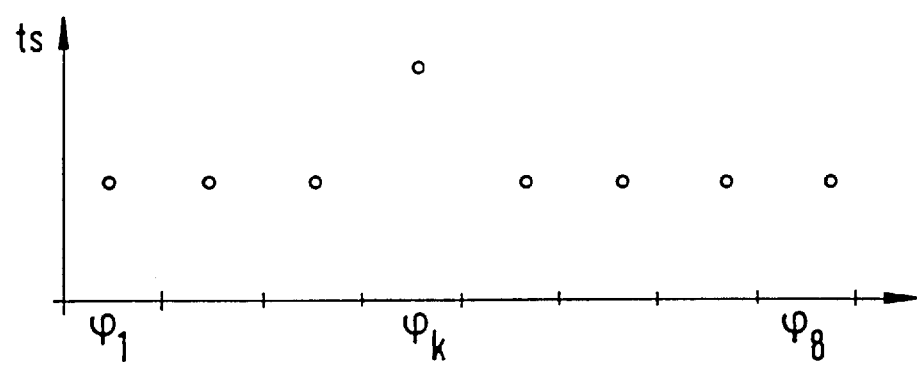
FIG. 3(b)
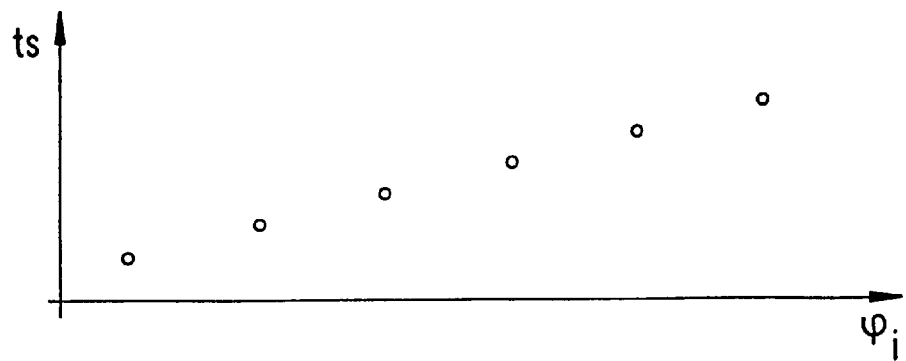
FIG. 3(c)

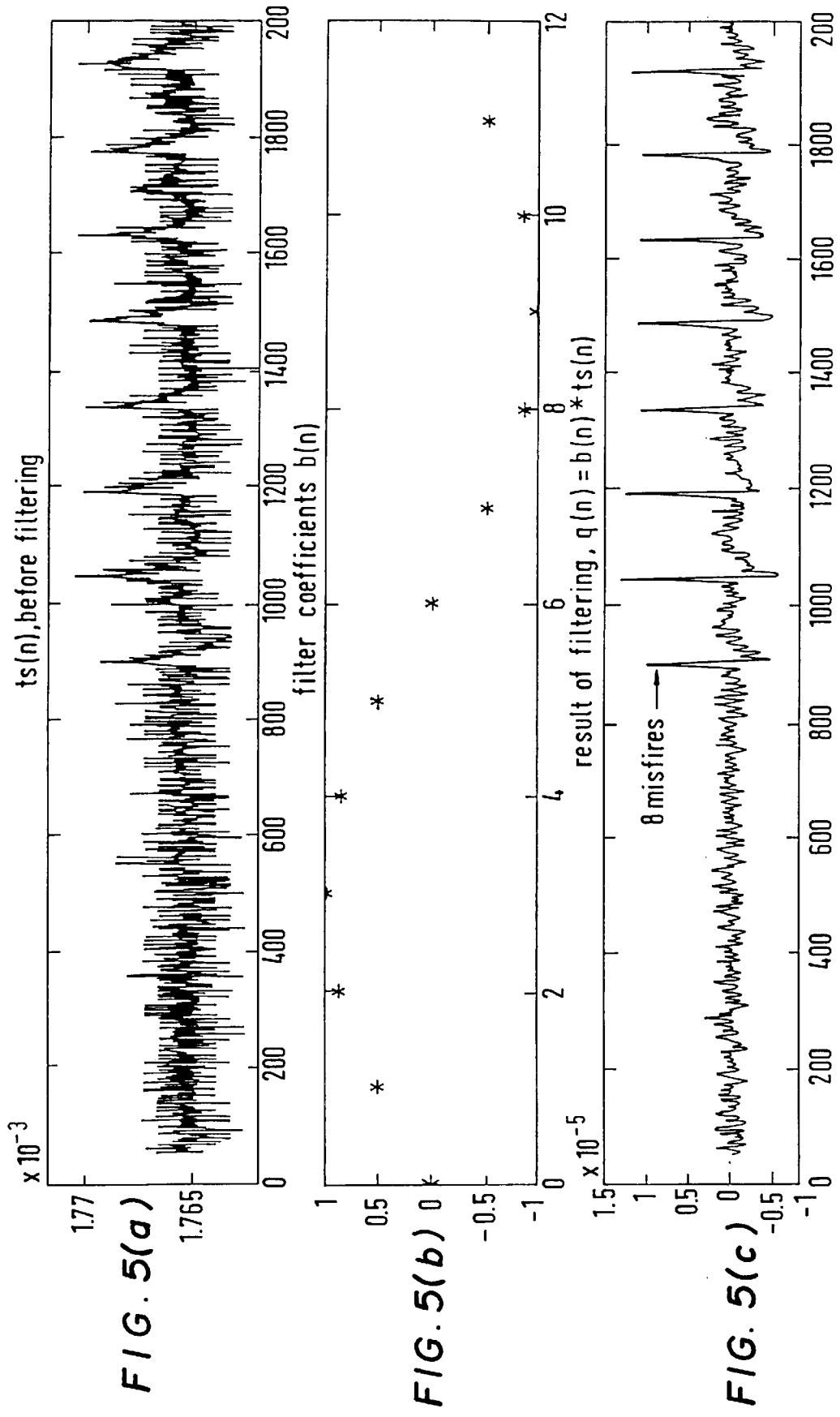

METHOD OF DETECTING COMBUSTION MISFIRES BY EVALUATING RPM FLUCTUATIONS

IN THE DISCLOSURE

The invention relates to a method for detecting combustion misfires in internal combustion engines.

BACKGROUND OF THE INVENTION

Combustion misfires lead to an increase of toxic substances emitted during operation of the engine and can, in addition, lead to damage of a catalytic converter in the exhaust-gas system of the engine. A detection of combustion misfires in the entire rpm and load ranges is necessary to satisfy statutory requirements as to onboard monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A method operating on this basis is already known from German patent publication 4,138,765.

In this known method, a crankshaft angular region which is characterized as a segment is assigned to each cylinder. The segments are realized, for example, by markings on a transducer wheel coupled to the crankshaft. The segment time in which the crankshaft passes through this angular region is dependent, inter alia, upon the energy converted in the combustion stroke. Misfires lead to an increase of the segment times detected in synchronism with the ignition. According to the known method, a criterion for the rough running of the engine is computed from the differences of the segment times. In addition, slow dynamic operations such as the increase of the engine rpm for a vehicle acceleration are mathematically compensated. A rough-running value which is computed in this way for each ignition, is likewise compared ignition-synchronously to a predetermined threshold value. Exceeding this threshold value is evaluated as a misfire. The threshold value is dependent, as may be required, from operating parameters such as load and engine speed (rpm).

The reliability with which misfires can be detected with this method drops naturally to a greater extent the less individual misfires operate on the rpm of the crankshaft. The reliability of the misfire detection therefore drops with increasing number of the cylinders of the engine and with increasing rpm as well as decreasing load.

SUMMARY OF THE INVENTION

In view of this background, the object of the invention is to provide a method which further improves the reliability of the misfire detection in internal combustion engines having a high number of cylinders even at high rpm and low loads.

The invention is based upon the realization that the segment time increase as a consequence of a misfire at high rpm is no longer distributed to one segment time but instead to several segment times.

An element of the invention comprises undertaking an evaluation including a greater crankshaft angle. This takes place, for example, by considering additional segment times before and after a possible misfire. Various computation rules have been shown to be advantageous for the computation of a rough-running quantity while considering further segment times. It is common for these rules that they are defined by discrete convolution in the signal processing stage and feature extraction stage by means of a digital filter and predetermined filter coefficients.

These various rules can be expressed without dynamic corrections with the following formula:

$$q(n) = \frac{\sum_{m=Ma}^{Me} b(m-Ma) \cdot ts(n-m)}{ts(n)^3} = \frac{1}{ts(n)^3} \cdot b(n)*ts(n)$$

wherein: b(n) are filter coefficients, Ma, Me are filter start and filter end, respectively, and M=Ma−Me+1 is the filter length and * is the convolution operator.

Multiplication by the reciprocal value of $ts(n)^3$ as a proportionality factor operates to eliminate the dependency upon rpm.

In lieu of the segment times, the speeds $\omega$, which are allocated to the segments, can be used:

$$q(n) \sim b(n)*\omega(n) \text{ or } \omega(n)(b(n)*\omega(n)) \text{ with}$$

$$b(n)*\omega(n) = \sum_{m=Ma}^{Me} b(m-Ma) \cdot \omega(n-m)$$

It is an essential feature of the invention that the methods for detecting misfires can be supplemented by methods for dynamic compensation. The object is to eliminate the influence of misfire-like rpm changes.

BRIEF DESCRIPTION OF THE DRAWINGS

The invention will now be described with reference to the drawings wherein:

FIGS. 3a–3c explains the known principle for forming segment times as a basis of a measure for the rough-running on the basis of rpm measurements;

DESCRIPTION OF THE PREFERRED EMBODIMENT OF THE INVENTION

Figure 1:
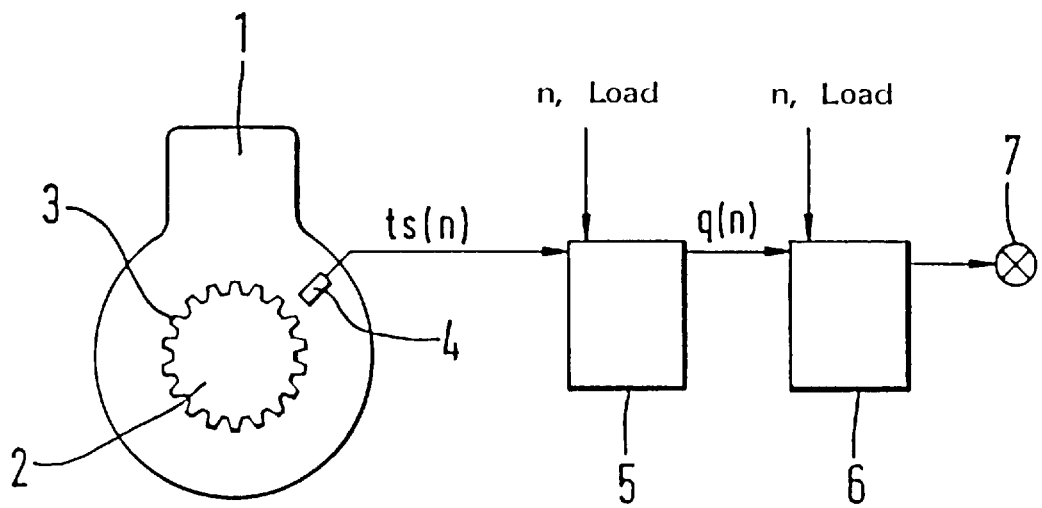
FIG. 1 shows the technical background of the invention.

FIG. 1 shows an internal combustion engine 1 having an angle transducer wheel 2 having markings 3 as well as an angle sensor 4, a block 5, which serves for signal processing and feature extraction, and a block 6. Block 6 functions to detect combustion misfires by evaluating the feature signals on the basis of threshold value comparisons, neuronal networks, fuzzy classifiers or even other known means and/or methods. Operating parameters of the engine such as load and rpm are supplied, as required, to the blocks 5 and 6. If combustion misfires are determined, then, for example, a warning lamp 7 can be switched on.

Figure 2:
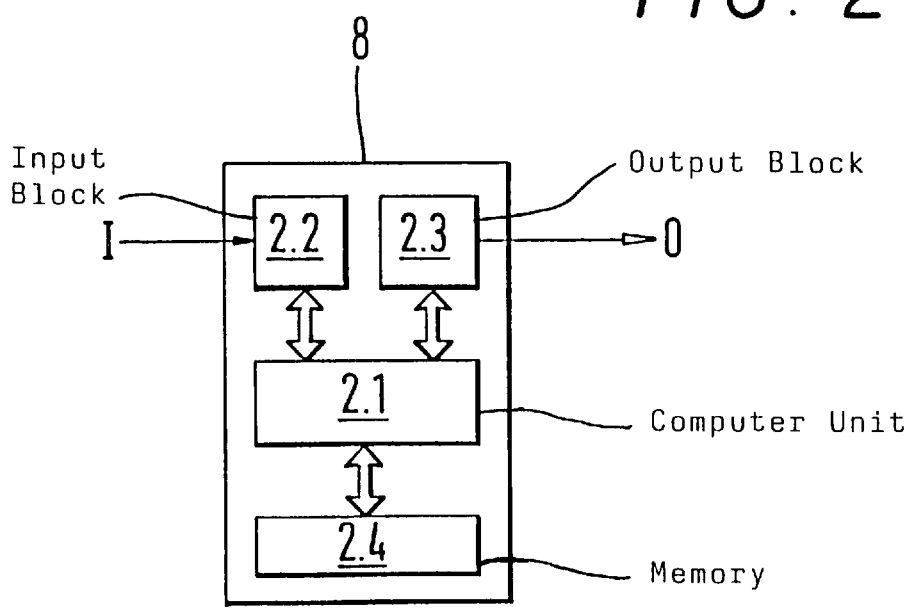
FIG. 2 defines a computer suitable for carrying out the method of the invention.

The essence of the invention concerns block 5, that is, the signal processing and feature extraction and/or obtaining the signal q(n) in FIG. 1. The function blocks 5 and 6 are preferably realized by programming a computer 8 having a basic function which is shown in FIG. 2. According to this basic function, a computer unit 2.1 arbitrates between an input block 2.2 and an output block 2.3 utilizing programs and data stored in a memory 2.4.

The angle transducer wheel is coupled to the crankshaft of the engine. The rotational movement of the angle transducer wheel is converted into an electrical signal with the aid of the angle sensor 4 which is realized as an inductive sensor. The periodicity of the electrical signal defines an image of the periodic passing of the markings 3 at the angle sensor 4. The time duration between an increase and a drop of the signal level therefore corresponds to the time in which the crankshaft has rotated further over an angular region corresponding to the extent of a marking.

These time durations are processed further in the control apparatus 8 to a measure q(n) for the rough running of the engine. The control apparatus 8 is realized as a computer.

FIG. 3a shows a subdivision of the angle transducer wheel into four segments wherein each segment has a predetermined number of markings. The marking OTk is assigned to that top dead center of the piston movement of the k-th cylinder of an internal combustion engine (in this embodiment, an eight-cylinder engine), which lies in the combustion stroke of this cylinder. A rotational angular region $\Phi_k$ is defined about this point and extends in this embodiment over one quarter of the markings of the angle transducer wheel. In the same manner, angular regions $\Phi_1$ to $\Phi_8$ are assigned to the combustion strokes of the remaining cylinders with a four-stroke principle being assumed wherein the crankshaft rotates twice for each complete work cycle. For this reason, the region $\Phi_1$ of the first cylinder corresponds to the region $\Phi_5$ of the fifth cylinder and so on. The angular regions, which correspond to one crankshaft revolution, can be separated from each other, can follow each other directly or can overlap each other. In the first case, markings are provided which are not assigned to any angular region. In the second case, each marking is allocated precisely to one angular region and, in the third case, the same markings can be assigned to different angular regions. Any desired lengths and positions of the angular regions are therefore possible.

In FIG. 3b, the times ts are plotted in which the angular regions are passed through with the rotational movement of the crankshaft. Here, a misfire in cylinder k is assumed. The absence of torque connected with this misfire leads to an increase of the corresponding time span ts. The time spans ts then already define a criterion for the rough running which is, in principle, suitable for detecting misfires. By a suitable processing of the time spans ts, the rough-running value receives the dimension of an acceleration and has an improved signal/noise ratio as has been shown empirically. The suitable processing is especially performed by forming the differences:

$$ts(n+1) - ts(n)$$

of mutually adjacent time spans and normalizing these differences to the third power of the time span ts(i) to an ignition stroke having index i.

FIG. 3c shows the influence of rpm changes on the detection of the time durations ts. The case of a reduction in rpm is shown as it typically occurs during overrun operation of a motor vehicle. This effect becomes manifest in a relatively uniform extension of the detected times ts. To compensate for this effect, it is, for example, known to form an additive corrective term D for dynamic compensation and, when the rough-running value is computed, to so consider this term D that the extension effect is compensated.

All of the following examples are with respect to a 12-cylinder engine but can be converted to combustion engines having other numbers of cylinders. A known feature value for a 12-cylinder engine is computed while eliminating the dependency on rpm by dividing by ts(n)$^3$ and dynamic compensation to form:

$$Lut(n) = \frac{ts(n-5)/12 - ts(n) + ts(n+1) - ts(n+7)/12}{ts(n)^3}$$

Figure 4:
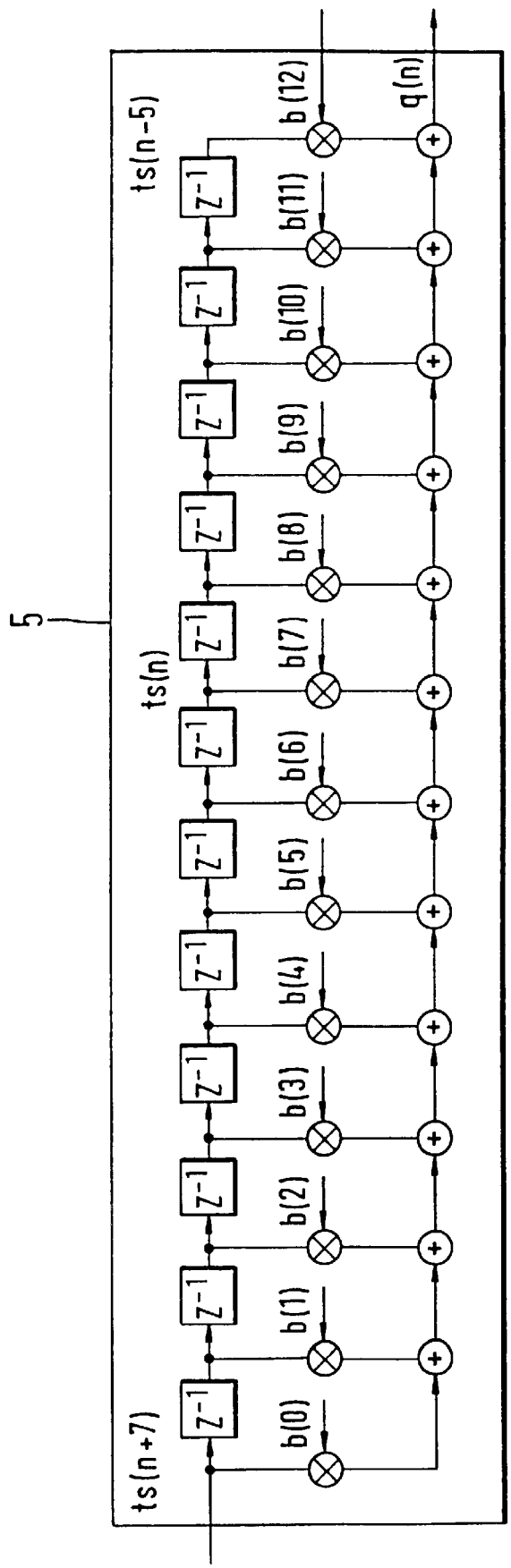
FIG. 4 shows a function block diagram of a digital filter having limited pulse response as an embodiment of the invention; and, FIGS. 5a–5c show the effect of the invention based on signal traces as a function of time.

An embodiment of the invention is realized by the digital filter shown in FIG. 4.

Twelve memory cells are shown in the upper row of FIG. 4 into which time-discrete sequential values of segment times ts are written. For each of the inputs of a segment time ts taking place from the left, the contents of the right memory cells are written over by the content of the next adjacent memory cells on the left-hand side. The content of each memory cell 1 to 12 in the center row of FIG. 4 is logically coupled multiplicatively to a filter coefficient b1 to b12 after the time discrete renewal. Each filter coefficient having index i is allocated to a memory cell having index i. The results of these logic couplings are summed in the lower row to the rough-running feature value q(n). Stated otherwise, each segment time is pushed through the arrangement from left to right and weighted in a time-discrete manner with various filter coefficients. The filtering shown corresponds to a digital filter having a limited pulse response.

The number 12 as a number of the memory cells assumes a 12-cylinder engine and filtering over one camshaft revolution. A filtering over a range of up to approximately two camshaft revolutions appears to be purposeful.

The result of this digital filtering for the case of a correlation of the misfire-typical increase in the segment time signal having a sine function over a complete camshaft revolution is shown in FIG. 5.

The variable rough-running feature signal q results from:

$$q_1(n) = c \cdot \frac{\sum_{i=-5}^{6} \sin(2\pi i/12) \cdot ts(n+i)}{ts(n)^3}$$

wherein: filter coefficients b=(sin(2πm/12); Ma≦m≦Me; Ma=−5; and, Me=6.

FIG. 5a shows the sequence of the unfiltered segment times ts and FIG. 5b defines the filter coefficients and FIG. 5c shows the time-dependent trace of the rough-running feature variable qn as a result of the time-discrete and value-discrete logic coupling of the segment times with the filter coefficients. The improved signal/noise ratio of q(n)-values compared to the unfiltered segment times is obvious.

A further possibility is the correlation of the misfire-typical increase in the segment-time signal having a jump function:

$$q_2(n) = c_0 \frac{\sum_{1}^{6} ts(n+i) - \sum_{0}^{5} ts(n-i)}{ts(n)^3}$$

wherein: b=(1 1 1 1 1 1 −1 −1 −1 −1 −1 −1); Ma=−5; and, Me=6.

A forming rule, which is denoted as segment-time curving, determines the deviation of the segment times from a straight line which is drawn between two segment time points lying at a distance from each other:

$$q_3(n) = c \cdot \frac{(33/12 - 6) \cdot ts(n-5) + \sum_{i=-2}^{3} ts(n+i) - 33/12 \cdot ts(n+7)}{ts(n)^3}$$

wherein: b=(-33/12 0 0 1 1 1 1 1 1 0 0 0 (33/12-6));
Ma=-7; and, Me=5.

A further embodiment arises by forming the difference between two different filter outputs. An example is the difference between a filtering over 360° and 720° crankshaft angle:

$$q_{4a}(n) = c \cdot \frac{\frac{1}{6} \sum_{-2}^{3} ts(n+i) - \frac{1}{12} \sum_{-5}^{6} ts(n+i)}{ts(n)^3}$$

wherein: b=1/12 (-1 -1 -1 1 1 1 1 1 1 -1 -1 -1);
Ma=-6; and, Me=5.

The slower filter effects the dynamic compensation for the difference between differently rapid filters. In addition to the form already shown, the following form is also possible:

$$q_{4b}(n) = c \cdot \frac{\frac{1}{6} \sum_{-5}^{0} ts(n+i) - \frac{1}{12} \sum_{-11}^{0} ts(n+i)}{ts(n)^3}$$

wherein: b=1/12 (1 1 1 1 1 1 -1 -1 -1 -1 -1 -1);
Ma=0; and, Me=11.

As a further alternative, a complex exponential function can be utilized. The result is complex. The phase information, which is present in addition to the magnitude, facilitates the cylinder identification.

$$q_5(n) = c \cdot \frac{\sum_{i=-5}^{6} e^{(-j2\pi i/12)} \cdot ts(n+i)}{ts(n)^3}$$

wherein: b=exp(j2π/12);
Ma=-6; and, Me=5.

Additional embodiments evaluate the increase over previously averaged segment times. The averaging can take place over one revolution of the crankshaft. Then, $q_2(n)$ results. For averaging over one camshaft revolution, one obtains:

$$q_6(n) = c \cdot \frac{\sum_{i=1}^{12} ts(n+i) - \sum_{0}^{11} ts(n-i)}{ts(n)^3}$$

wherein: b=(1 1 1 1 1 1 1 1 1 1 1 1
-1 -1 -1 -1 -1 -1 -1 -1 -1 -1 -1 -1);
Ma=-12; and, Me=11.

In addition, the statement of these features can be supplemented by the height of the segment time drop. The increase and the decrease within a crankshaft revolution of average segment times can be considered:

$$q_7(n) = c \cdot \frac{\sum_{i=-2}^{3} ts(n+i) - \sum_{-8}^{-3} ts(n+i) - \sum_{i=2}^{3} ts(n+i) - \sum_{4}^{9} ts(n+i)}{ts(n)^3}$$

wherein: b=(-1, -1, -1, -1, -1, -1
2, 2, 2, 2, 2, 2
-1, -1, -1, -1, -1, -1);
Ma=-9; and, Me=8.

As an alternative, the increase and decrease within one camshaft revolution can be considered:

$$q_8(n) = c \cdot \frac{\sum_{i=-5}^{6} ts(n+i) - \sum_{-17}^{-6} ts(n+i) + \sum_{i=5}^{6} ts(n+i) - \sum_{7}^{18} ts(n+i)}{ts(n)^3}$$

wherein: b=(-1 -1 -1 -1 -1 -1 -1 -1 -1 -1 -1 -1
2 2 2 2 2 2 2 2 2 2 2 2
-1 -1 -1 -1 -1 -1 -1 -1 -1 -1 -1 -1);
Ma=-17; and, Me=18.

An evaluation encompassing a greater crankshaft angular range is successful in a further embodiment from:

$$q_9(n) = c \cdot \frac{5ts(n-5)/3 - \left\{ \sum_{i=1}^{4} ts(n+1) - ts(n-i) \right\} - 5ts(n+7)/3}{ts(n)^3}$$

wherein: b=(-5/3 0 0 1 1 1 1 0 -1 -1 -1 -1 5/3);
Ma=-7; and, Me=5.

A further smoothing results from:

$$q_{10}(n) = \sum_{i=0}^{3} q_9(n-i)$$

The above-mentioned feature signals $q_1$, $q_2$, $q_5$, $q_6$, $q_7$ and $q_8$ can be supplemented in additional embodiments of the invention by measures for dynamic compensation. The object of these measures is to compensate the influence of rpm changes which, for example, are caused by a drop or increase of the mean engine rpm during driving operation with vehicle acceleration (FIG. 3c).

The slow filter effects the dynamic compensation for the rough-running feature quantities $q_{4a}$ and $q_{4b}$. The segment-time curvature $q_3$ already contains a dynamic compensation as do $q_9$ and $q_{10}$.

The methods for dynamic compensation are subject to a coarse subdivision. A first method is applied to signals which arise because of previous difference formation in the segment-time signal or in the filtered segment-time signal.

If one proceeds from linear increases of the segment times as a consequence of acceleration, then with:

$$dk_1(n) = \frac{ts(n-5) - ts(n+7)}{12}$$

a signal for rpm trend elimination can be derived which is changed into $q_9(n)$.

A second method is applied directly to the segment-time signal or the filtered segment-time signal. In principle, all signals are suitable for dynamic compensation which arise via lowpass formation from the segment-time signal. One example comprises the mean-value formation over 12 segment-time values:

$$dk_2(n) = 1/12 \sum_{i=-5}^{6} ts(n+i)$$

Furthermore, the possibility exists to use a median filter on the segment-time signal for dynamic compensation:

$$dk_3(n) = \text{Median}_{i=Ma}^{Me} (ts(n+i))$$

The computation of the signals for dynamic compensation can take place via digital filters. For the known examples, the following filter coefficients result:

Trend elimination $dk_1$ (n):
b=1/12 (1 0 0 0 0 0 0 0 0 0 0 0 −1);
Ma=−7; and, Me=5.
Lowpass filtering $dk_2$ (n):
b=1/12 (1 1 1 1 1 1 1 1 1 1 1 1);
Ma=−6; and, Me=5.
The median filter requires a nonlinear algorithm.

The methods for misfire detection can be taken together with those of dynamic compensation in a filter function.

We claim:

1. A method for detecting combustion misfires on the basis of the time-dependent course of the rotational movement of a transducer wheel, which is coupled to the crankshaft of an internal combustion engine, the method comprising the steps of:

detecting one of the following:
(a) the segment times (ts(n)) during which predetermined segments of the transducer wheel pass a sensor; and,
(b) the mean engine speeds (rpm) which are assigned to the segments of the transducer wheel;

forming a measure for the rough running of the engine by digitally filtering the segment times with predetermined filter coefficients;

drawing a conclusion as to misfire from the behavior of said measure;

said filtering detecting an angular range up to four camshaft revolutions and said filtering taking place via a filter having limited pulse response;

said filtering taking place in correspondence to the following rule:

$$q(n) \sim \sum_{m=Ma}^{Me} b(m-Ma) \cdot ts(n-m) = b(n)*ts(n)$$

wherein: b(n) are filter coefficients; Ma, Me are filter begin and filter end; M=Ma−Me+1 is filter length; * is convolution operator; n=numbers the ignition strokes in sequence; ts=segment times; q=rough-running feature signal; q(n)=rough-running feature signal for ignition stroke (n); ts(n)=segment times; and, b=filter coefficients with which the segment times ts(n) are weighted in the digital filtering thereof.

2. A method for detecting combustion misfires on the basis of the time-dependent course of the rotational movement of a transducer wheel, which is coupled to the crankshaft of an internal combustion engine, the method comprising the steps of:

detecting one of the following:
(a) the segment time (ts(n)) during which predetermined segments of the transducer wheel pass a sensor; and,
(b) the mean engine speeds (rpm) which are assigned to the segments of the transducer wheel;

forming a measure for the rough running of the engine by digitally filtering the segment times with predetermined filter coefficients;

drawing a conclusion as to misfire from the behavior of said measure;

said filtering detecting an angular range up to four camshaft revolutions and said filtering taking place via a filter having limited pulse response;

said filtering taking place in correspondence to the following rule:

$q(n) \sim b(n)*\omega(n)$ or $\omega(n)(b(n)*\omega(n))$ with $$b(n)*\omega(n) = \sum_{m=Ma}^{Me} b(m-Ma) \cdot \omega(n-m)$$

wherein: b(n) are filter coefficients; Ma, Me are filter begin and filter end; m=Ma−Me+1 is filter length; * is convolution operator; $\omega$(n)=angular speeds of crankshaft within specific segment times ts(n); n=numbers the ignition strokes in sequence; ts=segment times; q=rough-running feature signal; q(n)=rough-running feature signal for ignition stroke (n); ts(n)=segment times; and, b=filter coefficients with which the segment times ts(n) are weighted in the digital filtering thereof.

3. The method of claim 1, wherein function values of a complex exponential sine function or real sine function are used as filter coefficients.

4. The method of claim 1, wherein filter coefficients are used which are a measure for the deviation of the segment times from a straight line, which is drawn through two segment-time points lying at a distance from each other.

5. The method of claim 1, wherein the function values of a step function are used as filter coefficients.

6. The method of claim 1, wherein filter coefficients are used which define a difference in speeds with which the output quantity of the filter reacts to input changes at the input end thereof.

* * * * *